July 25, 1944.  H. H. SULLINS  2,354,339
ELECTRICAL EQUIPMENT
Filed Aug. 26, 1942

Inventor
Howard H. Sullins
By
Attorneys

Patented July 25, 1944

2,354,339

UNITED STATES PATENT OFFICE 2,354,339

ELECTRICAL EQUIPMENT

Howard H. Sullins, Detroit, Mich., assignor to General Motors Corporation, Detroit, Mich., a corporation of Delaware Application August 26, 1942, Serial No. 456,153

2 Claims. (Cl. 177—311)

This invention relates to a conductive electric system and more specifically to a readily applied system of conductors for charging batteries. It is well-known that with the present type of battery the same should not be allowed to become weak or discharged when it remains on the shelves of the retail merchant's store waiting to be sold. It is necessary to apply a very small amount of charging current or trickle charge to these batteries when they remain in storage in order to sustain full charge therein.

It is therefore an object of my invention to provide a conductive system for connecting storage batteries to a source of charging current.

It is a further object of my invention to provide a conductive system which may be easily attached to and disconnected from batteries for allowing the same to be slightly charged.

It is a still further object of my invention to provide a conductive system as above identified in which an indicator is provided to show whether or not current is flowing in the system.

With these and other objects in view which will become apparent as the specification proceeds, my invention will be best understood by reference to the following specification and claims and the illustrations in the accompanying drawing, in which:

Figure 1:
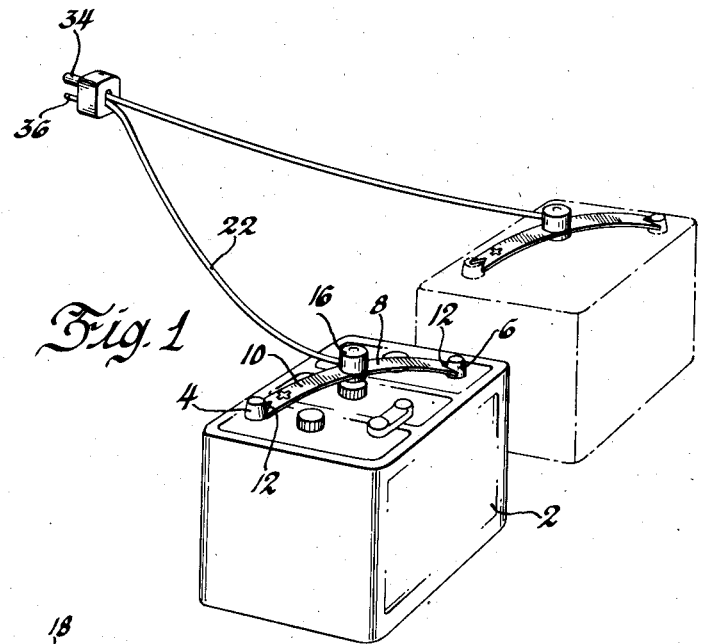
Figure 1 shows a perspective view of my system connected to batteries.
Figure 2:
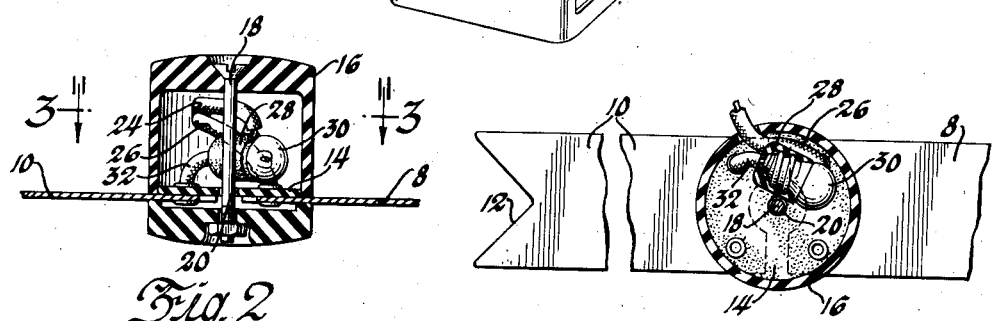
Figure 2 is a sectional view through a portion of the conductive system shown in Figure 1.
Figure 3:
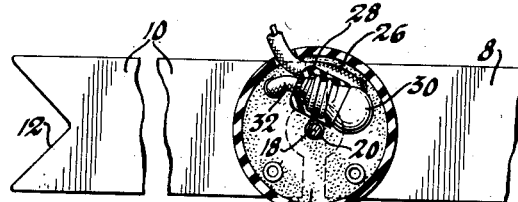
Figure 3 is a sectional view taken on line 3—3 of Figure 2.

Referring now more specifically to the drawing, Figure 1 shows a storage battery 2 having a positive pole 4 and a negative pole 6. Between these two poles is interposed the conducting system of my invention which comprises two conductive strips 8 and 10, each of which has a V-shaped notch 12 cut into the outer end so that they may better engage the posts of the battery, the inner ends being electrically insulated from each other by being attached in spaced relation to an insulating member 14 within a translucent insulating housing 16. This latter housing is formed of two pieces and is roughly cylindrical.

The two pieces are held together by a central bolt 18 which passes through an opening 20 in the insulating plate 14. A pair of conductive wires are brought through a cable 22 from a source of power and of these two wires 24 and 26 the first is connected to a socket 28 for a small incandescent bulb 30. The opposite socket terminal is connected by line 32 to one end of the conductive strip 10 and the other wire 26 is connected in like manner to the conductive strip 8.

It is thus evident that the circuit for a single battery proceeds from a terminal 34 through one of the cables, let us say 24, through the incandescent bulb 30, cable 32, conductive strip 10, battery post 4, battery 2, battery post 6, conductive strip 8, wire 26, back to the terminal 36. If therefore a suitable source of low voltage D. C. is provided at the polarized plug into which the receptacle will be forced, a small direct current will be allowed to flow through the battery and maintain the same in its charged condition. In order to be sure that the polarity is correct, a polarized plug is used and the strip is marked $+$. This small current will also light the bulb 30 whose rays will pass through the incandescent member 16 and indicate to the operator whether or not the battery is on charge. As many of these wiring harness systems may be provided as necessary with a particular installation, all of which are connected in parallel in the plug carrying the projecting prongs 34 and 36.

Figure 4:
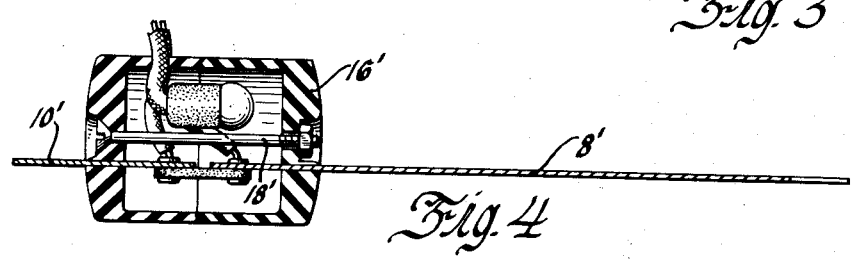
Figure 4 is a sectional view similar to Figure 2 of a modified form of my invention.

In Figure 4 a modified form of my invention is shown in which the cylindrical translucent housing or connector at the center of the two strips is in this instance mounted in a horizontal instead of a vertical position. Its diameter is in this instance greater than the width of the strips 8' and 10' which are applied and the center bolt 18' which holds the pieces together lies parallel to the axis of the strips. The translucent housing 16' is slightly larger but the operation of this is exactly the same.

Figure 5:
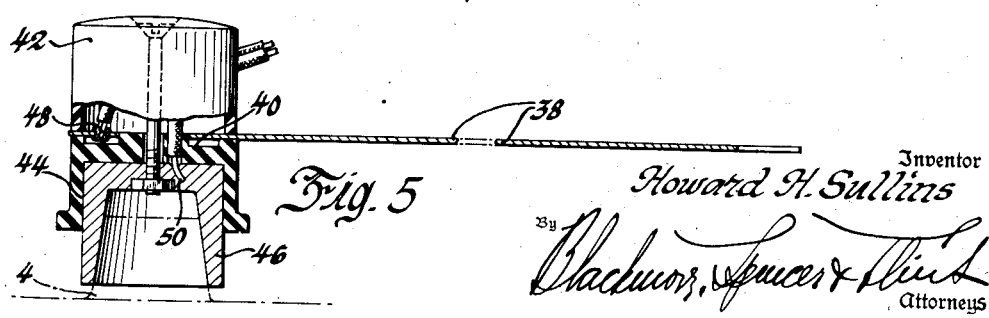
Figure 5 is a partial sectional view similar to Figures 2 and 4 of a still further modification.

Figure 5 shows a still further modification in which only one strip 38 is used but this must be long enough to extend between the two terminals of the battery and in this instance this strip extends into and is secured to an insulating disc 40 which is an integral part of the translucent cylindrical member 42 in much the same manner as above described. However, into a circular crater 44 in the bottom of the member 42 there is supported a conductive cap 46 which is adapted to be forced over one of the terminals 4 or 6 of the battery being charged. The supporting screw in this instance goes through the top of the cap 42 and is threaded into the member 46 to maintain the parts together as a unit. The two cables are in this instance connected one to the strip 38 as shown at 48, and one to the conducting coupling 46 as shown at 50. There is also provided as before a luminescent source connected into the line as previously described. In any of these instances there is sufficient spring in the conductive strip members to allow the assembly to be snapped into place.

It is therefore evident that I have provided a readily attachable and detachable trickle charging harness in which an indication is given as to whether or not the apparatus is in operation.

I claim:

1. In a device of the class described, a plurality of conductive resilient strips, insulating means supporting adjacent ends of said strips in spaced relation and in substantial alignment with each other, a translucent housing around the junction, a light source mounted within the housing, and conductors connecting the strips and light in series circuit.

2. In a detachable unit for application to storage battery posts, a plurality of resilient conductive strips in substantial alignment, insulating means supporting the adjacent ends of the strips in spaced relation so that the resilience of said unitary structure provides longitudinal pressure against the battery posts to maintain the unit in position and indicating means mounted on said insulating means connected in series relation with the conductive strips to indicate current flow.

HOWARD H. SULLINS.